United States Patent
Leroy Rene-Boisneuf et al.

(10) Patent No.: US 12,543,731 B2
(45) Date of Patent: Feb. 10, 2026

(54) INSECTICIDAL TABLET COMPOSITIONS

(71) Applicant: CLARKE MOSQUITO CONTROL PRODUCTS, INC., St. Charles, IL (US)

(72) Inventors: Laeticia Leroy Rene-Boisneuf, Naperville, IL (US); Yemi Susan Bullen-McClain, Vernon Hills, IL (US)

(73) Assignee: CLARKE MOSQUITO CONTROL PRODUCTS, INC., St. Charles, IL (US)

( * ) Notice: Subject to any disclaimer, the term of this patent is extended or adjusted under 35 U.S.C. 154(b) by 0 days.

(21) Appl. No.: 18/363,641

(22) Filed: Aug. 1, 2023

(65) Prior Publication Data

US 2024/0122177 A1  Apr. 18, 2024

Related U.S. Application Data

(60) Provisional application No. 63/379,354, filed on Oct. 13, 2022.

(51) Int. Cl.
| | | |
|---|---|---|
| *A01N 25/34* | (2006.01) | |
| *A01N 25/10* | (2006.01) | |
| *A01N 43/22* | (2006.01) | |
| *A01P 7/04* | (2006.01) | |

(52) U.S. Cl.
CPC ............. *A01N 25/34* (2013.01); *A01N 25/10* (2013.01); *A01N 43/22* (2013.01); *A01P 7/04* (2021.08)

(58) Field of Classification Search
CPC ........ A01N 25/34; A01N 25/10; A01N 43/22; A01P 7/04
See application file for complete search history.

(56) References Cited

U.S. PATENT DOCUMENTS

| | | | |
|---|---|---|---|
| 5,643,591 A * | 7/1997 | Mehra ................... | A61K 9/1652 424/464 |
| 8,222,430 B2 | 7/2012 | Kutose et al. | |
| 8,343,524 B2 * | 1/2013 | Willis ................... | A01N 43/22 424/464 |
| 8,420,608 B2 | 4/2013 | Fischer et al. | |
| 9,161,538 B2 | 10/2015 | Inagaki et al. | |
| 9,237,747 B2 | 1/2016 | Yerkes et al. | |
| 10,980,235 B2 | 4/2021 | Rene-Boisneuf et al. | |
| 11,350,648 B2 | 6/2022 | Martinez et al. | |
| 11,358,957 B2 | 6/2022 | Hoffman et al. | |
| 2010/0113269 A1 | 5/2010 | Pearson et al. | |
| 2010/0212074 A1 * | 8/2010 | Burt ........................ | E03D 9/032 4/231 |
| 2010/0286076 A1 | 11/2010 | Snyder et al. | |
| 2011/0160054 A1 | 6/2011 | Breuningger et al. | |
| 2015/0296773 A1 | 10/2015 | Hellwege et al. | |
| 2015/0313213 A1 | 11/2015 | Willis et al. | |
| 2016/0184340 A1 | 6/2016 | Kritikou | |
| 2017/0334953 A1 | 11/2017 | Ensign et al. | |
| 2022/0000120 A1 | 1/2022 | Gachango et al. | |
| 2022/0015364 A1 | 1/2022 | Weiss et al. | |
| 2022/0174963 A1 | 6/2022 | Bloomquist, III et al. | |

FOREIGN PATENT DOCUMENTS

| | | |
|---|---|---|
| CN | 102362601 A | 2/2012 |
| WO | 2003075893 A1 | 9/2003 |
| WO | 2009102206 A1 | 8/2009 |
| WO | 2016207666 A2 | 12/2016 |
| WO | 2022144403 A1 | 7/2022 |

OTHER PUBLICATIONS

Raju et al. Effect of Tablet Surface Area and Surface Area/Volume on Drug RElease from Lamivudine Extended RElease Matrix Tablets (International Journal of Pharmaceutical Sciences and Nanotechnology 3(1):872-876; published May 2010). (Year: 2010).*
Gimnig et al., "Efficacy of extended release formulations of Natular (spinosad) against larvae and adults of Anopheles mosquitoes in western Kenya," Malaria Journal, Nov. 2020, 19: Article 436 (13 pages).
International Search Report and Written Opinion for Application No. PCT/US2023/71464, dated Jan. 5, 2024 (29 pages).
Marina et al., "Spinosad as an effective larvicide for control of Aedes albopictus and Ades aegypti, vectors of dengue in southern Mexico," Pest Management Science, Nov. 2010, 67: 114-121 (8 pages).
International Search Report and Written Opinion for Application No. PCT/US2024/23872 dated Sep. 4, 2024 (10 pages).

* cited by examiner

*Primary Examiner* — Genevieve S Alley
(74) *Attorney, Agent, or Firm* — Michael Best & Friedrich LLP (57) ABSTRACT

Exemplary tablet compositions may comprise 7.0 weight percent (wt %) to 8.0 wt % of an active ingredient; 78 wt % to 85 wt % of a plaster; 9 wt % to 10 wt % of a water-soluble binder; 0.7 wt % to 0.8 wt % of a non-water soluble binder; and 0.9 wt % to 1.0 wt % of a lubricant. A diameter of the tablet composition may be no less than 7 mm and no greater than 12 mm. A hardness of the tablet composition may be no greater than 220 Newtons (N).

18 Claims, 8 Drawing Sheets

INSECTICIDAL TABLET COMPOSITIONS

CROSS-REFERENCE TO RELATED APPLICATION(S)

This application claims priority to U.S. Provisional Patent Application No. 63/379,354 filed on Oct. 13, 2022, the entire contents of which are incorporated herein by reference.

TECHNICAL FIELD

The present disclosure relates to insecticidal tablet compositions and methods of use.

INTRODUCTION

Insect populations may be controlled using a variety of methods. For instances, larvicides may be used to control insect populations. In some instances, larvicides may be formulated as tablets that provide extended release of an insecticide composition.

SUMMARY

In one aspect, a tablet composition is disclosed. Exemplary tablet compositions may comprise 7.0 weight percent (wt %) to 8.0 wt % of an active ingredient; 78 wt % to 85 wt % of a plaster; 9 wt % to 10 wt % of a water-soluble binder; 0.7 wt % to 0.8 wt % of a non-water soluble binder; and 0.9 wt % to 1.0 wt % of a lubricant. A diameter of the tablet composition may be no less than 7 mm and no greater than 12 mm. A hardness of the tablet composition may be no greater than 220 Newtons (N).

In another aspect, a method for making a tablet composition is disclosed. Exemplary methods may comprise mixing together 7.0 weight percent (wt %) to 8.0 wt % of an active ingredient; 78 wt % to 85 wt % of a plaster; 9 wt % to 10 wt % of a water-soluble binder; 0.7 wt % to 0.8 wt % of a non-water soluble binder; and 0.9 wt % to 1.0 wt % of a lubricant. Exemplary methods may also comprise extruding the mixture, separating extruded material into granules, separating granules above a predetermined maximum size and below a predetermined minimum size, adding a lubricant to the separated granules, and pressing a granule with lubricant into a tablet.

In another aspect, a method of using an insecticidal tablet composition is disclosed. Exemplary methods may comprise positioning the insecticidal tablet composition in a body of water, where the insecticidal tablet composition comprises 7.0 weight percent (wt %) to 8.0 wt % of an active ingredient; 78 wt % to 85 wt % of a plaster; 9 wt % to 10 wt % of a water-soluble binder; 0.7 wt % to 0.8 wt % of a non-water soluble binder; and 0.9 wt % to 1.0 wt % of a lubricant. A diameter of the tablet composition may be no less than 7 mm and no greater than 12 mm. A hardness of the tablet composition may be no greater than 220 Newtons (N).

There is no specific requirement that a material, technique, or method relating to insecticidal tablet compositions include all of the details characterized herein to obtain some benefit according to the present disclosure. Thus, the specific examples characterized herein are meant to be exemplary applications of the techniques described, and alternatives are possible.

DETAILED DESCRIPTION

Compositions, methods, and techniques disclosed and contemplated herein relate to insecticidal tablet compositions. Exemplary tablets may have a diameter no greater than 12 mm. Exemplary tablets may have a hardness no greater than 220 Newtons (N). Exemplary tablets may provide insecticidal control within 24 hours to 48 hours without including an effervescent layer. For instance, exemplary tablets may cause at least 80% mortality within a 24-48 hour period of being introduced into a water system.

I. Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

"Mosquito" is understood to refer to any species of the roughly 3,500 species of the insect that is commonly associated with and given the common name "mosquito." Mosquitoes span 41 insect genera, including the non-limiting examples of *Aedes, Culex, Anopheles* (carrier of malaria), *Coquillettidia*, and *Ochlerotatus*.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

II. Exemplary Insecticidal Tablet Compositions

Exemplary insecticidal tablet compositions may include various components at differing amounts. Various aspects of exemplary insecticidal tablet compositions are discussed below.

A. Release Profile

Exemplary insecticidal tablet compositions may be designed as formulations that can release active ingredient over an extended period of time. An extended period of time may be at least 9 weeks; at least 10 weeks; at least 11 weeks; or at least 12 weeks.

Exemplary insecticidal tablet compositions may be designed as formulations that can release active ingredient "immediately" as well as over an extended period of time. As used herein, "immediately" may mean achieving at least 80% mortality within 48 hours. This "immediate" release may be achieved without the inclusion of an effervescent layer in the insecticidal tablet composition.

B. Various Components of Exemplary Insecticidal Tablet Compositions

Exemplary insecticidal tablet compositions may include one or more active ingredients and various support components. For instance, exemplary insecticidal tablet compositions may comprise active ingredient, plaster, water-soluble binder, non-water-soluble binder, and lubricant.

Exemplary tablets typically do not have an effervescent layer. Exemplary tablets typically are effervescent free. Exemplary tablets typically comprise less than 0.01 weight percent (wt %) effervescent.

Exemplary insecticidal tablet compositions may comprise, consist essentially of, or consist of, one or more components disclosed and contemplated herein. Exemplary insecticidal tablet compositions may consist essentially of one or more components disclosed and contemplated herein. Exemplary insecticidal tablet compositions may consist of one or more components disclosed and contemplated herein.

Active ingredients suitable for use in exemplary insecticidal tablet compositions may be Spinosad-based. A commercially available example of a Spinosad is Spinosad NT (available from Corteva, Inc., Indianapolis, Indiana). Spinosad NT consists of the active ingredients Spinosyn A and Spinosyn D at a total nominal concentration of 90.4%. Spinosad NT is derived from the metabolites of the naturally occurring bacteria, *Sacchararopolyspora spinosa* and has been shown to be highly effective against a wide variety of insects including species from the orders Coleoptera, Diptera, Hymenoptera, Lepidoptera, and Thysanoptera.

Exemplary insecticidal tablet compositions may comprise plaster. Exemplary plasters may include, but are not limited to, plaster of Paris, lime plaster, cement plaster, and combinations thereof. Specific examples of plasters include, without limitation, Terra Alba, Snow White Filler, Puritan Pottery Plaster, No. 1 Moulding Plaster, No. 2 Moulding Plaster, Duramold Pottery Plaster, C-Base Plaster, Hydrocal A-11, Hydrocal B-11, Hydrocal X-21, Hydrocal MC, No. 1 Casting Plaster, Dental Plaster, Casting Plaster, Potting Plaster, Ultracal 30 Gypsum Cement, Ultracal 60 Gypsum Cement (all available from United States Gypsum), and combinations thereof.

Exemplary insecticidal tablet compositions may comprise water-soluble binder. Exemplary water-soluble binders may include, without limitation, acaia, gelatin, tragacanth, sucrose, guar gum, bentonite, methylcellulose, carboxymethylcellulose, microcrystalline cellulose, polyvinylpyrrolidone, polyvinyl alcohol, polyacrylic acid, polyethylene glycols of varying molecular weights, salts of alginic acid, lignins, and combinations thereof. Specific examples of polyethylene glycols include polyethylene glycols with molecular weights in the range from about 1000 to about 8500, which include Carbowax 3350, Carbowax 4000, Carbowax 6000, Carbowax 8000, and combinations thereof.

Exemplary insecticidal tablet compositions may comprise non-water soluble binder. Exemplary non-water soluble binders may include, without limitation, corn starch, pregelatinized starch, alginate, ethylcellulose, hydroxypropylcellulose, hydroxypropylmethylcellulose, polymethacrylate, dicalcium phosphate dihydrate, glyceryl behapate, and combinations thereof.

Exemplary insecticidal tablet compositions may comprise lubricant. Exemplary lubricants may include, without limitation, hydrogenated vegetable oils, mineral oil, talc, stearic acid, metallic stearates such as magnesium stearate, lauryl sulfate salts, boric acid, sodium chloride, sodium benzoate, sodium acetate, sodium oleate, polyethylene glycol, glyceryl behapate, and combinations thereof.

C. Example Amounts of Various Components of Exemplary Insecticidal Tablet Compositions Exemplary insecticidal tablet compositions may include various amounts of each component. Example constituents and possible amounts are provided below.

Exemplary insecticidal tablet compositions may include an active ingredient at 7.0 wt % (where wt % is percentage by weight) to 8.0 wt %. In various embodiments, a total amount of active ingredient present in exemplary insecticidal tablet compositions may be 7.0 wt % to 8.0 wt %; 7.1 wt % to 7.9 wt %; 7.2 wt % to 7.8 wt %; 7.3 wt % to 7.7 wt %; 7.4 wt % to 7.6 wt %; or 7.45 wt % to 7.55 wt %. In various embodiments, the total amount of active ingredient in exemplary insecticidal tablet compositions may be no less than 7.0 wt %; no less than 7.1 wt %; no less than 7.2 wt %; no less than 7.3 wt %; no less than 7.4 wt %; no less than 7.5 wt %; no less than 7.6 wt %; no less than 7.7 wt %; or no less than 7.8 wt %. In various embodiments, the total amount of active ingredient in exemplary insecticidal tablet compositions may be no greater than 7.1 wt %; no greater than 7.2 wt %; no greater than 7.3 wt %; no greater than 7.4 wt %; no greater than 7.5 wt %; no greater than 7.6 wt %; no greater than 7.7 wt %; no greater than 7.8 wt %; no greater than 7.9 wt %; or no greater than 8.0 wt %.

Exemplary insecticidal tablet compositions may include between 78 wt % to 85 wt % of a plaster. In various embodiments, a total amount of plaster in exemplary insecticidal tablet compositions may be 78.0 wt % to 85.0 wt %; 78.0 to 84.0 wt %; 79.0 wt % to 82 wt %; 79.5 wt % to 83.0 wt %; or 81.0 wt % to 82.0 wt %. In various embodiments, a total amount of plaster in exemplary insecticidal tablet compositions may be no less than 78.0 wt %; no less than 79.0 wt %; no less than 80.0 wt %; no less than 81.0 wt %; no less than 82.0 wt no less than; or no less than 83.0 wt %. In various embodiments, a total amount of plaster in exemplary insecticidal tablet compositions may be no greater than 79.0 wt %; no greater than 80.0 wt %; no greater than 81.0 wt %; no greater than 82.0 wt; no greater than 83.0 wt %; no greater than 84.0 wt %; or no greater than 85.0 wt %.

Exemplary insecticidal tablet compositions may include between 9.0 wt % and 10.0 wt % of a water-soluble binder. In various embodiments, a total amount of water-soluble binder in exemplary insecticidal tablet compositions may be 9.0 wt % to 10.0 wt %; 9.1 wt % to 9.9 wt %; 9.2 wt % to 9.8 wt %; 9.3 wt % to 9.7 wt %; 9.4 wt % to 9.6 wt %; 9.25 wt % to 9.65 wt %; or 9.4 wt % to 9.5 wt %. In various embodiments, a total amount of water-soluble binder in exemplary insecticidal tablet compositions may be no less than 9.0 wt %; no less than 9.1 wt %; no less than 9.2 wt %; no less than 9.3 wt %; no less than 9.4 wt %; no less than 9.5 wt %; no less than 9.6 wt %; no less than 9.7 wt %; no less than 9.8 wt %; or no less than 9.9 wt %. In various embodiments, a total amount of water-soluble binder in exemplary insecticidal tablet compositions may be no greater than 10.0 wt %; no greater than 9.9 wt %; no greater than 9.8 wt %; no greater than 9.7 wt %; no greater than 9.6 wt %; no greater than 9.5 wt %; no greater than 9.4 wt %; no greater than 9.3 wt %; no greater than 9.2 wt %; or no greater than 9.1 wt %.

Exemplary insecticidal tablet compositions may include between 0.7 wt % and 0.8 wt % of a non-water-soluble binder. In various embodiments, a total amount of non-water-soluble binder in exemplary insecticidal tablet compositions may be 0.7 wt % to 0.8 wt %; 0.71 wt % to 0.79 wt %; 0.72 wt % to 0.78 wt %; 0.74 wt % to 0.77 wt %; or 0.74 wt % to 0.76 wt %. In various embodiments, a total amount of non-water-soluble binder in exemplary insecticidal tablet compositions may be no less than 0.70 wt %; no less than 0.71 wt %; no less 0.72 wt %; no less than 0.73 wt %; no less than 0.74 wt %; no less than 0.75 wt %; no less than 0.76 wt %; no less than 0.77 wt %; no less than 0.78 wt %; or no less than 0.79 wt %. In various embodiments, a total amount of non-water-soluble binder in exemplary insecticidal tablet compositions may be no greater than 0.71 wt %; no greater 0.72 wt %; no greater than 0.73 wt %; no greater than 0.74 wt %; no greater than 0.75 wt %; no greater than 0.76 wt %; no greater than 0.77 wt %; no greater than 0.78 wt %; no greater than 0.79 wt %; or no greater than 0.80 wt %.

Exemplary insecticidal tablet compositions may include between 0.9 wt % and 1.0 wt % of lubricant. In various embodiments, a total amount of lubricant in exemplary insecticidal tablet compositions may be 0.9 wt % to 1.0 wt %; 0.91 wt % to 0.99 wt %; 0.92 wt % to 0.98 wt %; 0.93 wt % to 0.97 wt %; 0.94 wt % to 0.96 wt %; 0.925 wt % to 0.965 wt %; or 0.945 wt % to 0.955 wt %. In various embodiments, a total amount of lubricant in exemplary insecticidal tablet compositions may be no less than 0.9 wt %; no less than 0.91 wt %; no less than 0.92 wt %; no less than 0.93 wt %; no less than 0.94 wt %; no less than 0.95 wt %; no less than 0.96 wt %; no less than 0.97 wt %; no less than 0.98 wt %; or no less than 0.99 wt %. In various embodiments, a total amount of lubricant in exemplary insecticidal tablet compositions may be no greater than 1.0 wt %; no greater than 0.99 wt %; no greater than 0.98 wt %; no greater than 0.97 wt %; no greater than 0.96 wt %; no greater than 0.95 wt %; no greater than 0.94 wt %; no greater than 0.93 wt %; no greater than 0.92 wt %; or no greater than 0.91 wt %.

D. Physical Characteristics of Exemplary Insecticidal Tablet Compositions

Exemplary insecticidal tablet compositions may have a release profile enabling release of active ingredient over a period of time. Various physical characteristics of exemplary insecticidal tablet compositions are discussed below.

Exemplary insecticidal tablet compositions may have various shapes. In some instances, exemplary insecticidal tablet compositions may be cylindrical. In some instances, exemplary insecticidal tablet compositions have a generally round cross-section. In some instances, exemplary insecticidal tablet compositions have a circular cross-section. In some instances, exemplary insecticidal tablet compositions may have a generally planar top surface and/or bottom surface. In some instances, exemplary insecticidal tablet compositions may have a rounded top surface and/or bottom surface.

Exemplary insecticidal tablet compositions may have various sizes. Size may be described in terms of a diameter. As used herein, a "diameter" is defined as a diameter of a circular cross section or the longest dimension of a generally round cross section. In some instances, exemplary insecticidal tablet compositions may have a diameter no less than 7 millimeters (mm) and no greater than 12 mm. In some instances, exemplary insecticidal tablet compositions may have a diameter between 8 mm and 12 mm; between 7 mm and 9 mm; between 8 mm and 10 mm; between 9 mm and 11 mm; or between 10 mm and 12 mm. In various instances, exemplary insecticidal tablet compositions may have a diameter no less than 7 mm; no less than 8 mm; no less than 9 mm; no less than 10 mm; no less than 11 mm; or no less than 12 mm. In various instances, exemplary insecticidal tablet compositions may have a diameter no greater than 7 mm; no greater than 8 mm; no greater than 9 mm; no greater than 10 mm; no greater than 11 mm; or no greater than 12 mm. In various instances, exemplary insecticidal tablet compositions have a diameter of about 8 mm. In various instances, exemplary insecticidal tablet compositions have a diameter of about 8.1 mm. In various instances, exemplary insecticidal tablet compositions have a diameter of about 10 mm. In various instances, exemplary insecticidal tablet compositions have a diameter of about 12 mm.

Exemplary insecticidal tablet compositions may have various masses. In some instances, exemplary insecticidal tablet compositions may have a mass between 420 milligrams (mg) and 875 mg. In various instances, exemplary insecticidal tablet compositions may have a mass between 420 mg and 875 mg; between 425 mg and 850 mg; between 420 mg and 600 mg; between 425 mg and 570 mg; between 500 mg and 875 mg; between 420 mg and 440 mg; between 420 mg and 430 mg; between 540 mg and 600 mg; between 825 mg and 875 mg; between 420 mg and 430 mg; between 560 mg and 580 mg; between 570 mg and 850 mg; or between 840 mg and 860 mg. In various instances, exemplary insecticidal tablet compositions may have a mass of no less than 420 mg; no less than 425 mg; no less than 500 mg; no less than 550 mg; no less than 570 mg; no less than 650 mg; no less than 750 mg; no less than 800 mg; or no less than 850 mg. In various instances, exemplary insecticidal tablet compositions may have a mass of no greater than 875 mg; no greater than 850 mg; no greater than 810 mg; no greater than 760 mg; no greater than 710 mg; no greater than 650 mg; no greater than 600 mg; no greater than 570 mg; no greater than 500 mg; no greater than 430 mg; or no greater than 425 mg.

Exemplary insecticidal tablet compositions may have various surface areas. In some instances, exemplary insecticidal tablet compositions may have a surface area between 180 mm$^2$ and 365 mm$^2$; between 180 mm$^2$ and 320 mm$^2$; between 180 mm$^2$ and 190 mm$^2$; between 220 mm$^2$ and 240 mm$^2$; between 305 mm$^2$ and 325 mm$^2$; or between 345 mm$^2$ and 365 mm². In various instances, exemplary insecticidal tablet compositions may have a surface area of no less than 180 mm²; no less than 200 mm²; no less than 220 mm²; no less than 230 mm²; no less than 250 mm²; no less than 270 mm²; no less than 290 mm²; no less than 310 mm²; no less than 320 mm²; no less than 330 mm²; or no less than 350 mm². In various instances, exemplary insecticidal tablet compositions may have a surface area of no greater than 360 mm²; no greater than 340 mm²; no greater than 320 mm²; no greater than 300 mm²; no greater than 280 mm²; no greater than 260 mm²; no greater than 240 mm²; no greater than 220 mm²; no greater than 200 mm²; or no greater than 180 mm².

Exemplary insecticidal tablet compositions may have various hardness values. The hardness of tablets may be tested by any standard method that measures the fracturing/breaking point (compressive force) of a tablet. For example, an MHT-100 Portable Hardness Tester manufactured by the Pharma Alliance Group (Valencia, Calif.) may be used.

Typically, the hardness of exemplary insecticidal tablet compositions is no greater than 220 N. In various instances, a hardness of exemplary insecticidal tablet compositions is between 95 N and 220 N; between 100 N and 210 N; between 100 N and 150 N; between 160 N and 215 N; between 170 N and 212 N; between 95 N and 110 N; between 130 N and 150 N; between 175 N and 190 N; between 120 N and 190 N; or between 200 N and 215 N. In various instances, a hardness of exemplary insecticidal tablet compositions is no less than 95 N; no less than 100 N; no less than 105 N; no less than 115 N; no less than 120 N; no less than 125 N; no less than 135 N; no less than 145 N; no less than 155 N; no less than 165 N; no less than 175 N; no less than 185 N; no less than 195 N; or no less than 205 N. In various instances, a hardness of exemplary insecticidal tablet compositions is no greater than 220 N; no greater than 210 N; no greater than 200 N; no greater than 190 N; no greater than 180 N; no greater than 170 N; no greater than 160 N; no greater than 150 N; no greater than 140 N; no greater than 130 N; no greater than 120 N; no greater than 110 N; or no greater than 100 N.

Exemplary insecticidal tablet compositions may have various volumes. In some instances, exemplary insecticidal tablet compositions may have a volume between 190 mm³ and 405 mm³; between 190 mm³ and 295 mm³; between 295 mm³ and 405 mm³; between 190 mm³ and 205 mm³; between 390 mm³ and 405 mm³; between 194 mm³ and 202 mm³; or between 392 mm³ and 398 mm³. In some instances, exemplary insecticidal tablet compositions may have a volume no less than 190 mm³; no less than 195 mm³; no less than 197 mm³; no less than 200 mm³; no less than 225 mm³; no less than 250 mm³; no less than 275 mm³; no less than 300 mm³; no less than 325 mm³; no less than 350 mm³; no less than 375 mm³; no less than 390 mm³; no less than 392 mm³; no less than 395 mm³; or no less than 400 mm³. In some instances, exemplary insecticidal tablet compositions may have a volume no greater than 405 mm³; no greater than 400 mm³; no greater than 398 mm³; no greater than 396 mm³; no greater than 394 mm³; no greater than 391 mm³; no greater than 365 mm³; no greater than 340 mm³; no greater than 315 mm³; no greater than 290 mm³; no greater than 265 mm³; no greater than 240 mm³; no greater than 215 mm³; no greater than 200 mm³; no greater than 198 mm³; no greater than 196 mm³; or no greater than 194 mm³.

Exemplary insecticidal tablet compositions may have various compressed densities. In some instances, exemplary insecticidal tablet compositions may have a compressed density between 2.10 mg/mm³ and 2.20 mg/mm³; between 2.12 mg/mm³ and 2.18 mg/mm³; between 2.13 mg/mm³ and 2.17 mg/mm³; or between 2.14 mg/mm³ and 2.16 mg/mm³. In some instances, exemplary insecticidal tablet compositions may have a compressed density no less than 2.10 mg/mm³; no less than 2.12 mg/mm³; no less than 2.14 mg/mm³; no less than 2.16 mg/mm³; or no less than 2.18 mg/mm³. In some instances, exemplary insecticidal tablet compositions may have a compressed density no greater than 2.20 mg/mm³; no greater than 2.18 mg/mm³; no greater than 2.16 mg/mm³; no greater than 2.14 mg/mm³; or no greater than 2.12 mg/mm³.

Exemplary insecticidal tablet compositions may have various ratios of hardness (N) to surface area (mm²). Without being bound by a particular theory, the ratio of hardness to surface area (N/mm²) may impact the release profile of an insecticidal tablet composition. In some instances, exemplary insecticidal tablet compositions may have a ratio of hardness to surface area (N/mm²) between 0.50 N/mm² and 0.80 N/mm²; between 0.50 N/mm² and 0.65 N/mm²; between 0.65 N/mm² and 0.80 N/mm²; between 0.52 N/mm² and 0.77 N/mm²; between 0.50 N/mm² and 0.55 N/mm²; between 0.65 N/mm² and 0.71 N/mm²; or between 0.73 N/mm² and 0.80 N/mm². In some instances, exemplary insecticidal tablet compositions may have a ratio of hardness to surface area (N/mm²) no less than 0.50 N/mm²; no less than 0.52 N/mm²; no less than 0.54 N/mm²; no less than 0.56 N/mm²; no less than 0.58 N/mm²; no less than 0.60 N/mm²; no less than 0.62 N/mm²; no less than 0.64 N/mm²; no less than 0.66 N/mm²; no less than 0.68 N/mm²; no less than 0.70 N/mm²; no less than 0.72 N/mm²; no less than 0.74 N/mm²; no less than 0.76 N/mm²; or no less than 0.78 N/mm². In some instances, exemplary insecticidal tablet compositions may have a ratio of hardness to surface area (N/mm²) no greater than 0.80 N/mm²; no greater than 0.78 N/mm²; no greater than 0.76 N/mm²; no greater than 0.74 N/mm²; no greater than 0.72 N/mm²; no greater than 0.70 N/mm²; no greater than 0.68 N/mm²; no greater than 0.66 N/mm²; no greater than 0.64 N/mm²; no greater than 0.62 N/mm²; no greater than 0.60 N/mm²; no greater than 0.58 N/mm²; no greater than 0.56 N/mm²; no greater than 0.54 N/mm²; or no greater than 0.52.

III. Exemplary Methods of Making

Exemplary insecticidal tablet compositions disclosed and contemplated herein can be generally prepared by various methods. An exemplary method may begin by combining various constituents in an appropriate vessel, which may be combined with mixing. Exemplary constituents may be in powder form. Exemplary constituents are described in greater detail above, and may include active ingredient, plaster, water-soluble binder, and non-water-soluble binder.

A resulting combination of ingredients may be extruded. Resulting extrusions may have various shapes, such as cylinders. Then, the extruded material may be separated into granules. Separation of the extruded material may be performed using a granulator and/or chopper unit.

Resulting granules from the separation may be sieved to narrow the particle size distribution. Sieving for overs and fines may enable keeping a pour density constant for later operations. In some instances, sieving may comprise using a #10 mesh (2 mm) for overs. In some instances, sieving may comprise using a #12 mesh (1.68 mm) for overs. In some instances, sieving may comprise using a #30 mesh (0.595 mm) for fines. In some instances, separating the granules is performed such that granules over a predetermined maximum size, such as more than 2 mm, and below a predetermined minimum size, such as less than 0.595, are removed.

Next, a lubricant may be added to the sieved granules. Lubricant may be a powder. In some instances, lubricant may be gently mixed with the sieved granules.

Then, the granules with lubricant may be pressed into tablets at desired pressures. In one embodiment the tablets may be round with beveled edges of varying thickness and diameter. The tablets may be any shape or size desired depending on the selection of the punch and die and the amount of fill material required to achieve the requisite amount of active ingredient and the desired release characteristics. As used herein, "tablet" forms include tablets themselves as well as other solid forms or shapes known in the art such as sticks, pucks, briquettes, pellets, beads, spheres, granules, micro-granules, extrudates, cylinders, ingot, and the like. Any shape tablet may be used in accordance with the invention and is only limited by the ingenuity of the tool and die maker.

Various pressures may be used to press the tablets. For instance, exemplary tablets may be pressed at a pressure between 140 MPa and 310 MPa; between 140 MPa and 160 MPa; between 145 MPa and 155 MPa; between 150 MPa and 300 MPa; between 290 MPa and 310 MPa; or between 295 MPa and 305 MPa. In various instances, exemplary tablets may be pressed at a pressure no less than 140 MPa; no less than 150 MPa; no less than 175 MPa; no less than 200 MPa; no less than 225 MPa; no less than 250 MPa; no less than 275 MPa; or no less than 300 MPa. In various instances, exemplary tablets may be pressed at a pressure no greater than 310 MPa; no greater than 285 MPa; no greater than 260 MPa; no greater than 235 MPa; no greater than 210 MPa; no greater than 185 MPa; no greater than 160 MPa; or no greater than 150 MPa.

IV. Exemplary Methods of Use

Exemplary insecticidal tablet compositions disclosed and contemplated herein can be used in methods for pest control. For instance, exemplary insecticidal tablet compositions may be placed in aqueous media, such as bodies of water. Exemplary tablets may also be placed in an area that is intermittently wet.

Examples of application sites include, without limitation, marine and freshwater aquatic environments, storm water drainage areas, sewers and catch basins, woodland pools, snow pools, roadside ditches, retention ponds, freshwater dredge spoils, tire tracks, rock holes, pot holes and similar areas subject to holding water; natural and manmade aquatic sites, fish ponds, ornamental ponds and fountains, other artificial water-holding containers or tanks, flooded crypts, transformer vaults, abandoned swimming pools, construction and other natural or manmade depressions, stream eddies, creek edges, and detention ponds; freshwater swamps and marshes including mixed hardwood swamps, cattail marsh, common reed wetland, water hyacinth ponds, and similar freshwater areas with emergent vegetation; brackish water swamps and marshes, intertidal areas; sewage effluent, sewers, sewage lagoons, cesspools, oxidation ponds, septic ditches and tanks, animal waste lagoons and settling ponds, livestock runoff lagoons, wastewater impoundments associated with fruit and vegetable processing, and similar areas. Other examples include, without limitation, dormant rice fields (for application during the interval between harvest and preparation of the field for the next cropping cycle), and in standing water within pastures/ hay fields, rangeland, orchards, and citrus groves where mosquito breeding occurs.

In exemplary methods of use, exemplary insecticidal tablet compositions cause a mortality rate of at least 80% against each of *Aedes albopictus, Culex quinquefasciatus*, and *Aedes aegypti* after 48 hours. In exemplary methods of use, after 48 hours, exemplary insecticidal tablet compositions maintain a target mortality rate for at least 9 weeks; at least 10 weeks; at least 11 weeks; or at least 12 weeks. Exemplary target mortality rates may be at least 80% mortality; at least 85% mortality; at least 90% mortality; or at least 95% mortality.

V. Example Tablet Designs

Four example tablet designs are shown in FIGS. 1A-4B and described in detail below. Other configurations and sizes than those shown are contemplated. Dimensions in FIGS. 1A-4B are shown in millimeters (mm) with the brackets ([ ]) showing the dimensional equivalent in inches.

Figure 1A:
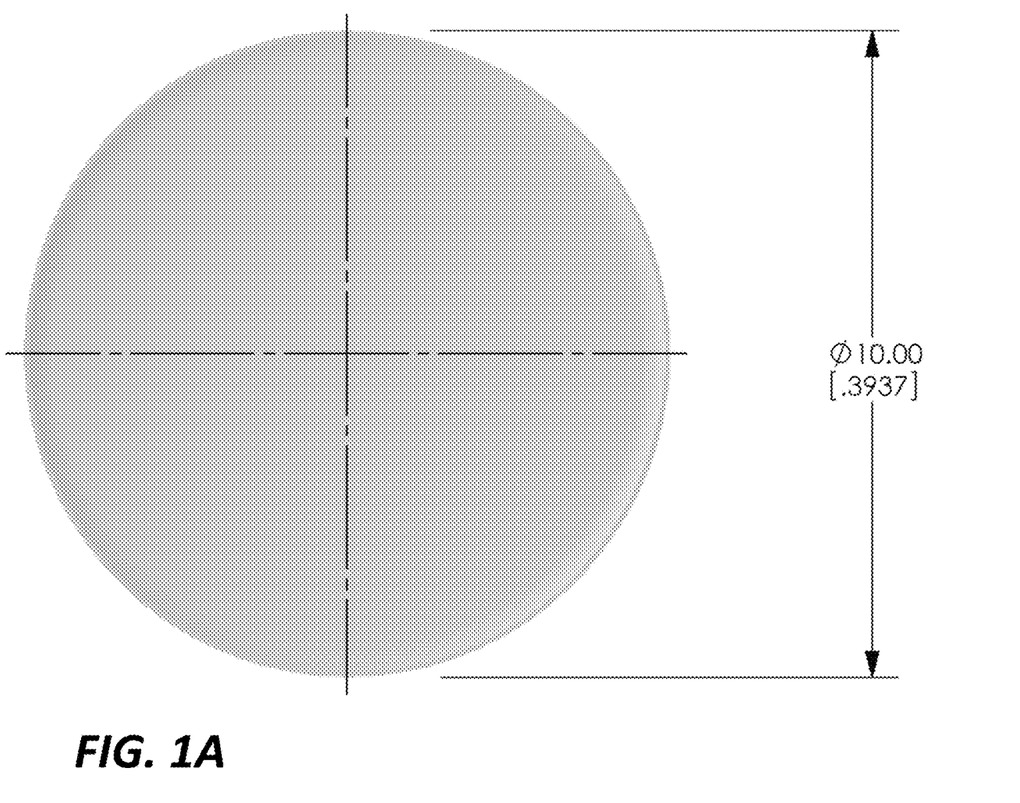
FIG. 1A shows a top plan view of an exemplary insecticidal tablet.
Figure 1B:
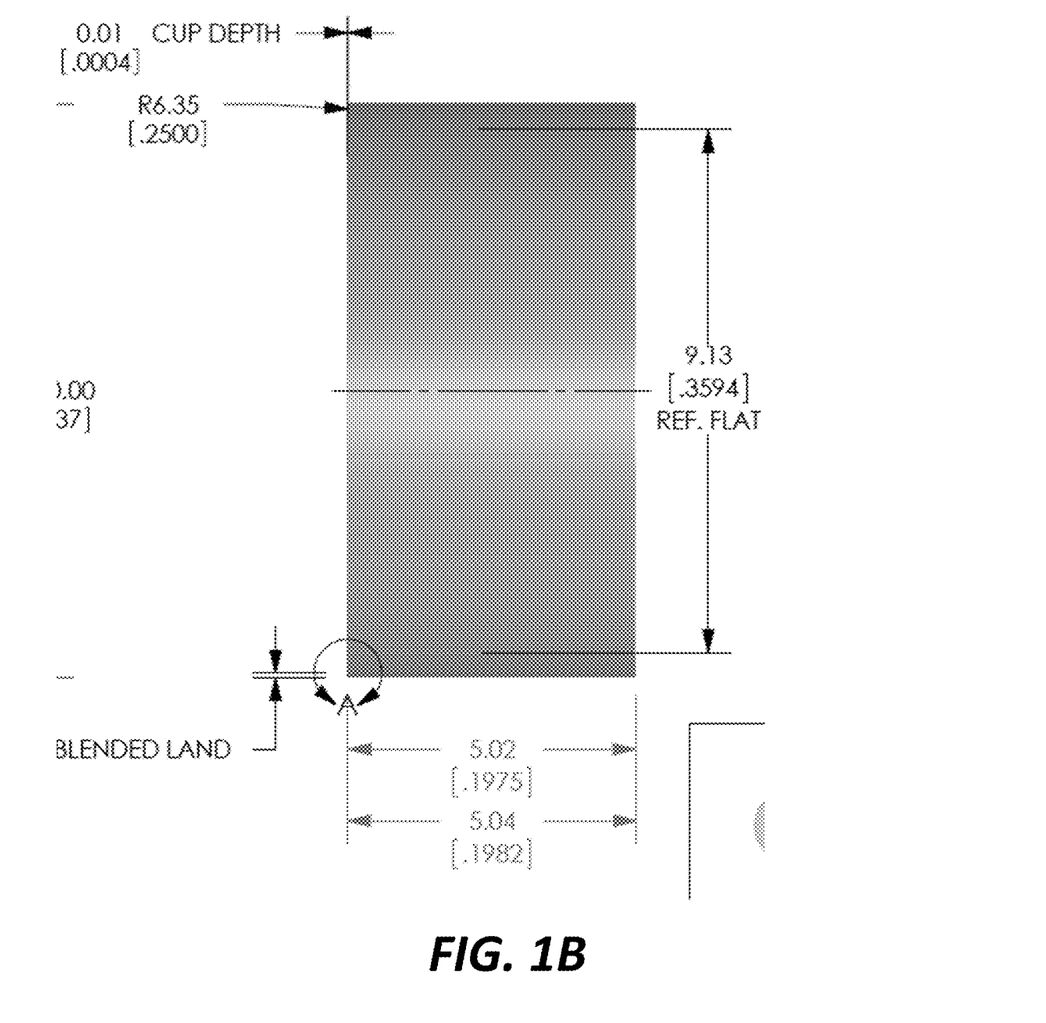
FIG. 1B shows a side plan view of the tablet shown in FIG. 1A.

FIG. 1A and FIG. 1B show various views of an exemplary insecticidal tablet composition having a diameter of 10 mm. FIG. 1A is a top plan view and FIG. 1B is a side plan view. The tablet shown in FIG. 1A and FIG. 1B has a volume of 395.35 $mm^3$, a weight of 850 mg, a compressed density of 2.15 $mg/mm^3$, and a total surface area of 314.65 $mm^2$. The tablet shown in FIG. 1A and FIG. 1B has a diameter of 10.00 mm and an approximate height of 5.04 mm.

Figure 2A:
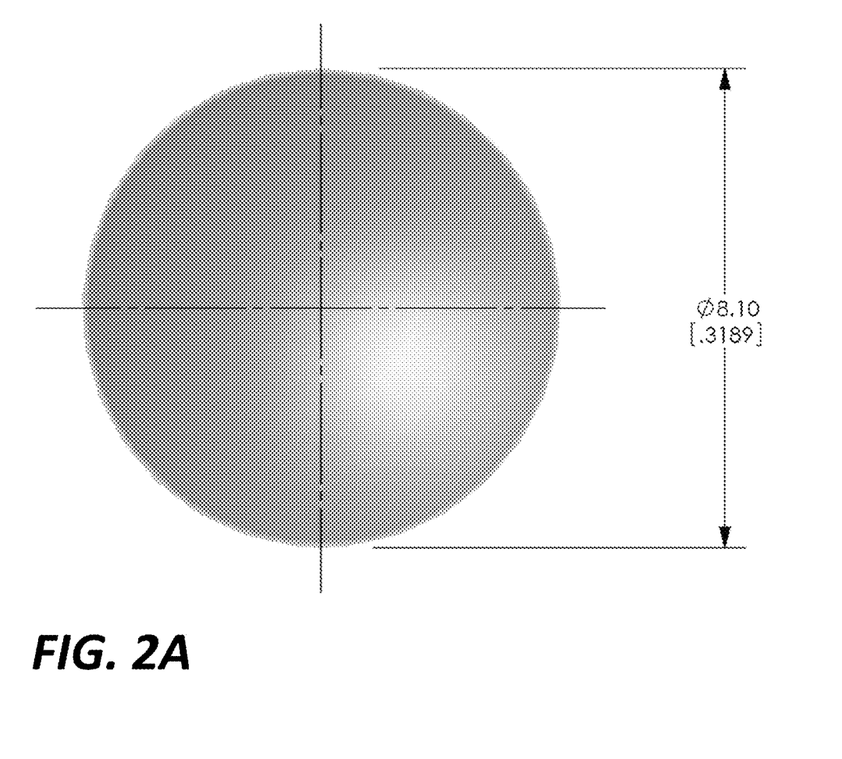
FIG. 2A shows a top plan view of another exemplary insecticidal tablet.
Figure 2B:
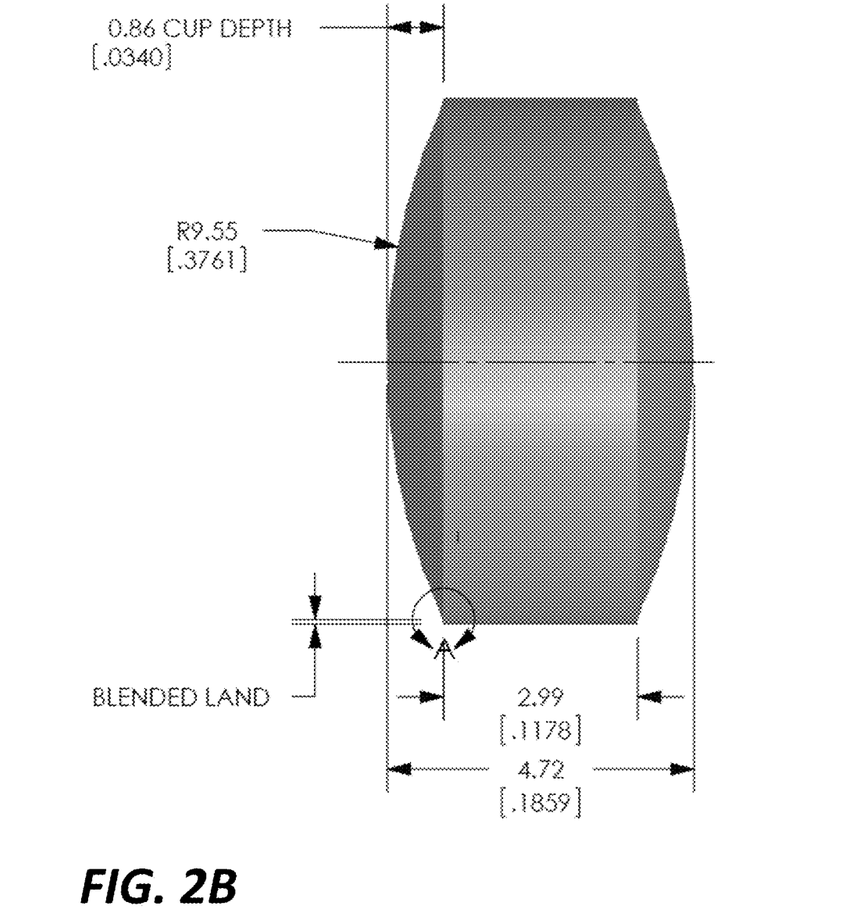
FIG. 2B shows a side plan view of the tablet shown in FIG. 2A.

FIG. 2A and FIG. 2B show various views of an exemplary insecticidal tablet composition having a diameter of 8 mm and having a rounded top surface and a rounded bottom surface (convex surfaces). FIG. 2A is a top plan view and FIG. 2B is a side plan view. The tablet shown in FIGS. 2A-2B has a volume of 197.67 $mm^3$, a weight of 425 mg, a compressed density of 2.15 $mg/mm^3$, and a total surface area of 183.90 $mm^2$. The tablet shown in FIG. 2A and FIG. 2B has a diameter of 8.10 mm and an approximate height of 4.72 mm.

Figure 3A:
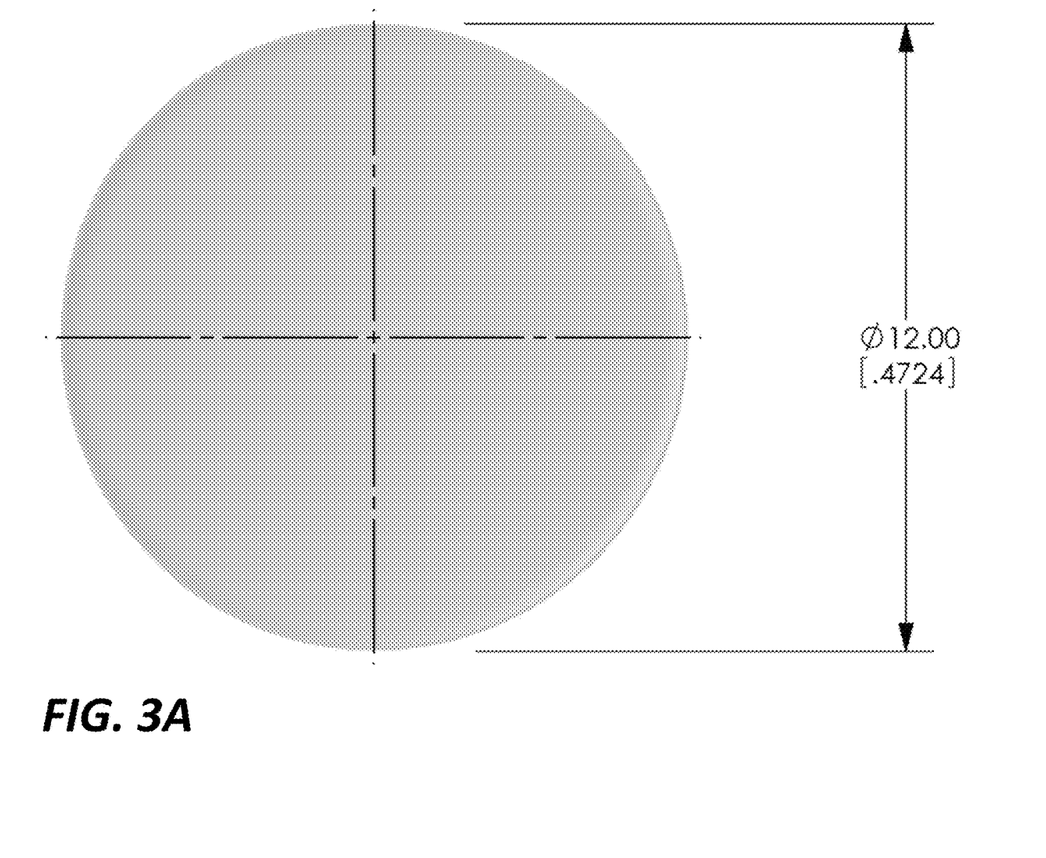
FIG. 3A shows a top plan view of another exemplary insecticidal tablet.
Figure 3B:
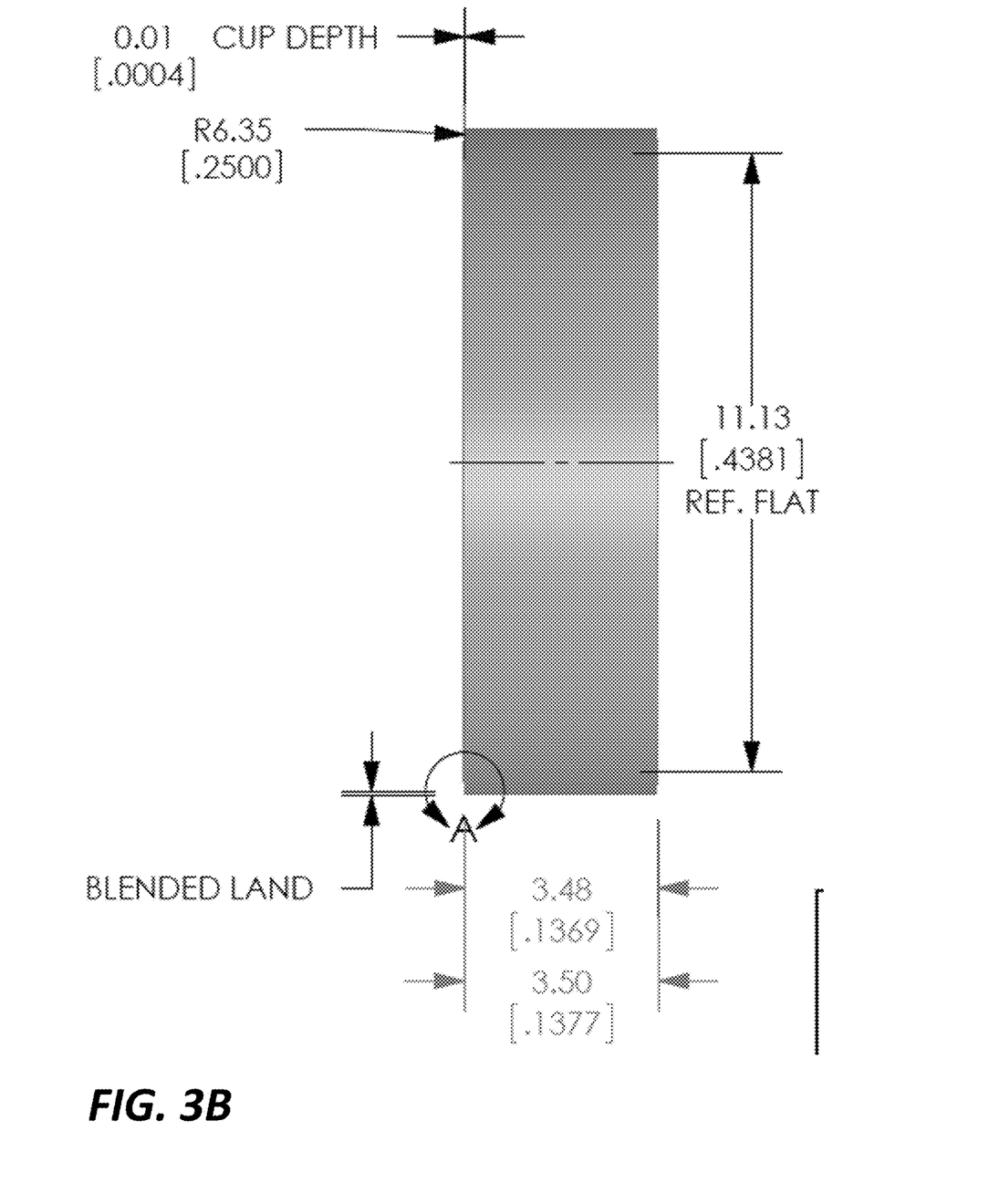
FIG. 3B shows a side plan view of the tablet shown in FIG. 3A.

FIG. 3A and FIG. 3B show various views of an exemplary insecticidal tablet composition having a diameter of 12 mm. FIG. 3A is a top plan view and FIG. 3B is a side plan view. The tablet shown in FIGS. 3A-3B has a volume of 395.35 $mm^3$, a weight of 850 mg, a compressed density of 2.15 $mg/mm^3$, and a total surface area of 357.29 $mm^2$. The tablet shown in FIG. 3A and FIG. 3B has a diameter of 12.00 mm and an approximate height of 3.50 mm.

Figure 4A:
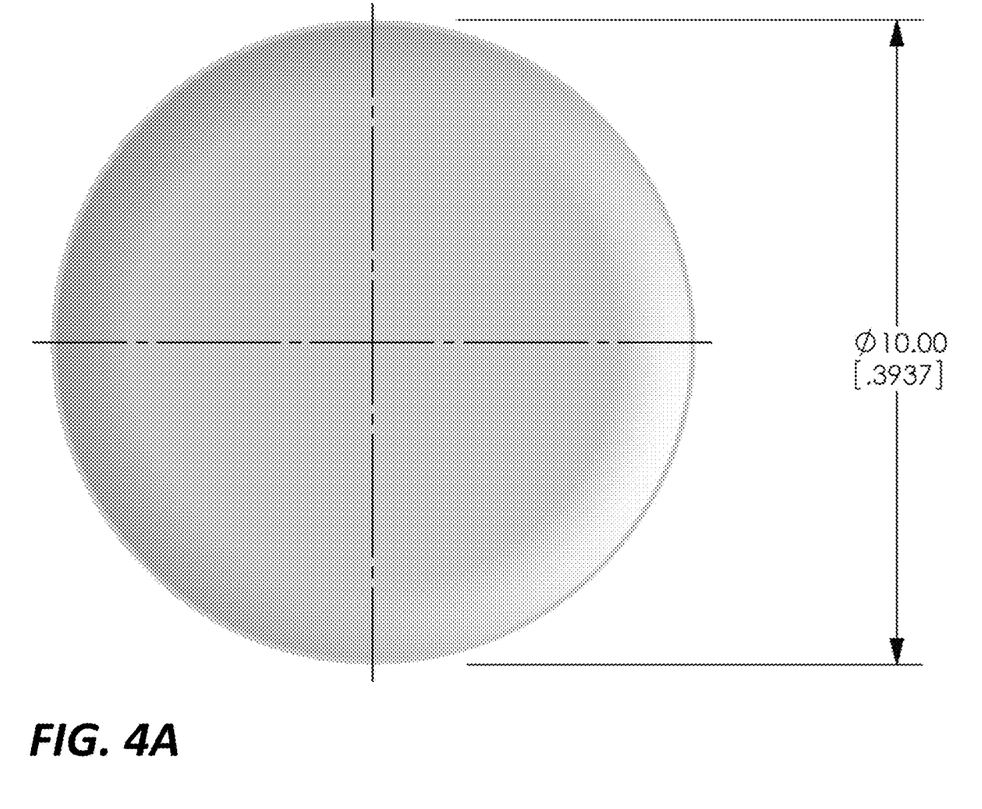
FIG. 4A shows a top plan view of another exemplary insecticidal tablet.
Figure 4B:
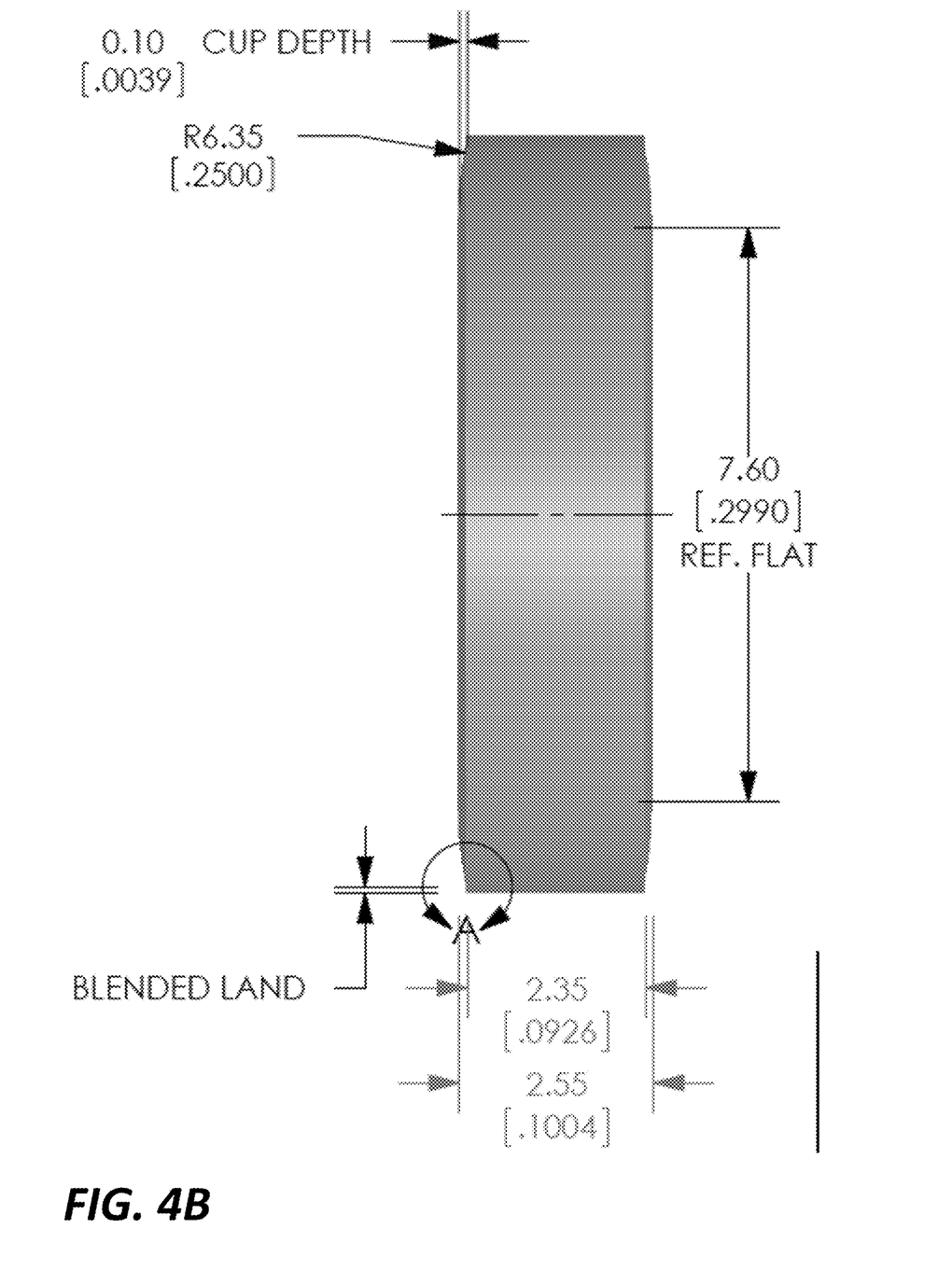
FIG. 4B shows a side plan view of the tablet shown in FIG. 4A.

FIG. 4A and FIG. 4B show various views of an exemplary insecticidal tablet composition having a diameter of 10 mm. FIG. 4A is a top plan view and FIG. 4B is a side plan view. The tablet shown in FIGS. 4A and 4B has a volume of 197.67 $mm^3$, a weight of 425 mg, a compressed density of 2.15 $mg/mm^3$, and a total surface area of 231.28 $mm^2$. The tablet shown in FIG. 4A and FIG. 4B has a diameter of 10.00 mm and an approximate height of 2.55 mm.

VI. Experimental Examples

Experimental examples were evaluated and the results are discussed below.
A. Experimental Tablet Sizing and Hardness Evaluation
1. Tablet Manufacture In a laboratory environment, exemplary insecticidal tablets were made by mixing Spinosad, plaster, polyethylene glycol, and calcium hydrogen phosphate dihydrate powders. The resulting mixture was extruded into compacted noodles. The extruded noodles were granulated and then sieved to narrow the particle size. Magnesium stearate was added to the granules and tablets were pressed at a pressure of 150 MPa or 300 MPa. Each tablet included 7.48 wt % Spinosad. Table 1 below details the tested tablets.

TABLE 1

Experimental tablets.

| Lot | Mass (mg) | Diameter (mm) | Pressure (MPa) |
|---|---|---|---|
| 1 | 850 | 12 | 150 |
| 2 | 850 | 12 | 300 |
| 3 | 850 | 10 | 150 |
| 4 | 850 | 10 | 300 |
| 5 | 425 | 10 | 150 |
| 6 | 425 | 10 | 300 |
| 7 | 425 | 8 | 150 |
| 8 | 425 | 8 | 300 |

2. Hardness Testing

Experimental tablets having the properties in Table 1 above were subjected to hardness testing. Ten tablets of each lot were subjected to hardness testing using (1) a Pharma Alliance Group Breaking Force Tester—Model: PAH01 and (2) a Pharma Alliance Group Breaking Force Tester—Model: THT-2PX. During testing, a tablet was placed in the center of the tester platform just touching the fixed anvil on the left. After closing the guard cover, force was applied by rotating the knurled hand wheel counterclockwise at an even speed. The force was increased until the tablet fractured, and the test unit displayed the maximum force. The results from the testing are shown in Table 2, below, where the hardness values for the ten tablets in each lot were averaged.

TABLE 2

Hardness values for experimental tablets shown in Table 1 as determined using the Pharma Alliance Group Breaking Force Tester - Model: PAH01, the THT-2PX model, and the average.

| Lot | Diameter (mm) | Pressure (MPa) | Surface Area (mm$^2$) | Hardness (N) PAH01 | Harness (N) THT-2PX | Hardness Average (N) |
|---|---|---|---|---|---|---|
| 1 | 12 | 150 | 357.29 | 185.06 | 173.39 | 179.22 |
| 2 | 12 | 300 | 357.29 | 197.52 | 175.97 | 186.74 |
| 3 | 10 | 150 | 231.28 | 165.76 | 236.29 | 201.03 |
| 4 | 10 | 300 | 231.28 | 167.26 | 254.52 | 210.89 |
| 5 | 10 | 150 | 183.90 | 106.79 | 94.55 | 100.67 |
| 6 | 10 | 300 | 183.90 | 111.11 | 100.98 | 106.05 |
| 7 | 8 | 150 | 183.90 | 125.86 | 158.44 | 142.15 |
| 8 | 8 | 300 | 183.90 | 125.41 | 150.32 | 137.86 |

3. Mosquito Testing

Experimental tablets having the properties in Table 1 above were tested against *Aedes aegypti* mosquito larvae. For each test, a single tablet was introduced to a 50-liter (L) body of water and 48-hour mortality was measured each week. Fifty larvae were added per container, and a weekly water exchange of 3×30% (overall 90%) was performed. Mortality was recorded at 24 hours and 48 hours post larvae introduction.

As comparisons, the tests also included separate containers with a control (no insecticide was used). Results are provided in Table 3, below.

TABLE 3

48-hour mortality rate for *Aedes aegypti* in 50 L containers.

| Lot | Week 1 | 2 | 3 | 4 | 5 | 6 | 7 | 8 | 9 |
|---|---|---|---|---|---|---|---|---|---|
| Control | 2% | 5% | 1% | 0% | 0% | 5% | 0% | 0% | 0% |
| 1 | 84% | 100% | 97% | 100% | 100% | 100% | 98% | 94% | 92% |
| 2 | 61% | 84% | 99% | 100% | 100% | 100% | 99% | 99% | 87% |
| 3 | 75% | 100% | 99% | 100% | 97% | 97% | 89% | 99% | 98% |
| 4 | 51% | 100% | 96% | 100% | 100% | 96% | 92% | 99% | 84% |
| 5 | 71% | 89% | 95% | 100% | 97% | 94% | 70% | 81% | 70% |
| 6 | 50% | 90% | 65% | 100% | 100% | 100% | 90% | 99% | 75% |
| 7 | 69% | 96% | 80% | 95% | 100% | 97% | 91% | 75% | 76% |
| 8 | 43% | 95% | 93% | 99% | 100% | 98% | 94% | 92% | 86% |

B. Various Size Testing against *Aedes aegypti*, *Aedes albopictus*, and *Culex quinquefasciatus*

Three different tablet configurations were tested: Tablet A, Tablet B, and Tablet C. Table 4 provides various details regarding each test tablet.

TABLE 4

Experimental tablets.

| Property | Tablet A | B | C |
|---|---|---|---|
| Diameter (mm) | 10 | 10 | 8 |
| Hardness (N) | 165 | 188 | 125 |
| Mass (mg) | 850 | 570 | 425 |
| Surface area (mm$^2$) | 315 | 247 | 184 |
| Active ingredient (wt. %) | 7.48 | 7.48 | 7.48 |
| Plaster (wt. %) | 81.4 | 81.4 | 81.4 |
| Water-soluble binder (wt. %) | 9.5 | 9.5 | 9.5 |
| Non-water soluble binder (wt. %) | 0.75 | 0.75 | 0.75 |
| Lubricant (wt. %) | 0.95 | 0.95 | 0.95 |
| Hardness to Surface area ratio (N/mm$^2$) | 0.52 | 0.76 | 0.68 |

Experimental tablets having the properties in Table 4 above were tested against *Aedes aegypti*, *Aedes albopictus*, and *Culex quinquefasciatus* mosquito larvae.

1. *Aedes aegypti* Testing

Table 5 below shows results of Tablets A, B, and C against *Aedes aegypti*. For each test, a single tablet was introduced to a 50-liter (L) body of water, equivalent to 1,272 µg, 853 µg and 636 µg of active ingredient per liter respectively. 24 and 48-hour mortality were measured each week. Fifty larvae were added per container, and a 30% water exchange was performed 3 times per week (overall 90%). Mortality was recorded at 48 hours post larvae introduction.

TABLE 5

48-hour mortality rate for *Aedes aegypti* in 50 L containers.

| Tablet | Week (mortality %) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Control | 0.5 | 0.5 | 0 | 1.0 | 0.5 | 4.0 | 1.0 | 0.5 | 0.0 | 16.5 | 5.0 | 9.0 |
| A | 89.0 | 98.0 | 100 | 100 | 100 | 100 | 99.5 | 100 | 100 | 100 | 100 | 100 |
| B | 87.0 | 99.5 | 100 | 100 | 100 | 100 | 100 | 100 | 100 | 100 | 100 | 100 |
| C | 81.5 | 98.5 | 100 | 100 | 100 | 100 | 100 | 100 | 100 | 100 | 100 | 100 |

As shown in Table 5, Tablet A, Tablet B, and Tablet C each offer control against *Aedes aegypti* for at least 12 weeks.

2. *Aedes albopictus* Testing

Table 6 below shows results of Tablets A, B, and C against *Aedes albopictus*. For each test, a single tablet was introduced to a 50-liter (L) body of water, equivalent to 1,272 µg, 853 µg and 636 µg of active ingredient per liter respectively. 24 and 48-hour mortality were measured each week. Fifty larvae were added per container, and a 30% water exchange was performed 3 times per week (overall 90%). Mortality was recorded at 48 hours post larvae introduction

TABLE 6

48-hour mortality rate for *Aedes albopictus* in 50 L containers.

| Tablet | Week (mortality %) | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Control | 0.0 | 0.7 | 0.0 | 8.0 | 6.7 | 0.0 | 1.3 | 5.3 | 8.7 | 9.3 | 4.0 | 2.7 |
| A | 98.7 | 100 | 100 | 100 | 100 | 100 | 100 | 100 | 100 | 100 | 100 | 100 |
| B | 99.3 | 100 | 100 | 100 | 100 | 100 | 100 | 100 | 100 | 100 | 100 | 100 |
| C | 98.7 | 100 | 100 | 100 | 100 | 100 | 100 | 100 | 100 | 100 | 100 | 100 |

As shown in Table 6, Tablet A, Tablet B, and Tablet C each offer control against *Aedes albopictus* for at least 12 weeks.

3. *Culex quinquefasciatus* Testing

Table 7 below shows results of Tablets A, B, and C against *Culex quinquefasciatus*. For each test, a single tablet was introduced to a 50-liter (L) body of water, equivalent to 1,272 µg, 853 µg and 636 µg of active ingredient per liter respectively. 24 and 48-hour mortality were measured each week.

TABLE 7

48-hour mortality rate for *Culex quinquefasciatus* in 50 L containers.

| Tablet | Week (mortality %) | | | | | | | | |
|---|---|---|---|---|---|---|---|---|---|
| | 1 | 2 | 3 | 4 | 5 | 6 | 7 | 8 | 9 |
| Control (for Tablet A) | 1.5 | 1.0 | 0.0 | 1.0 | 1.0 | 0.0 | 4.0 | 1.0 | 4.5 |
| Tablet A | 87.5 | 92.0 | 99.5 | 96.5 | 98.0 | 95.0 | 89.5 | 79.5 | 97.0 |
| Control (for Tablet B) | 1.5 | 1.0 | 0.0 | 1.0 | 1.0 | 0.0 | 0.7 | 1.0 | 2.0 |
| Tablet B | 96.0 | 99.5 | 100 | 98.0 | 93.5 | 97.0 | 100 | 99.0 | 92.0 |
| Control (for Tablet C) | 4.0 | 6.0 | 6.0 | 2.0 | 1.0 | 0.5 | 2.0 | 0.5 | 0.0 |
| Tablet C | 95.0 | 96.5 | 88.0 | 92.5 | 92.0 | 87.5 | 99.5 | 99.5 | 99.5 |

As shown in Table 7, Tablet A, Tablet B, and Tablet C offer control against *Culex quinquefasciatus* for at least 9 weeks.

Embodiments

For reasons of completeness, the following Embodiments are provided.

Embodiment 1. A tablet composition, comprising:
- 7.0 weight percent (wt %) to 8.0 wt % of an active ingredient;
- 78 wt % to 85 wt % of a plaster;
- 9 wt % to 10 wt % of a water-soluble binder;
- 0.7 wt % to 0.8 wt % of a non-water soluble binder; and
- 0.9 wt % to 1.0 wt % of a lubricant,
- wherein a diameter of the tablet composition is no less than 7 mm and no greater than 12 mm; and
- wherein a hardness of the tablet composition is no greater than 220 Newtons (N).

Embodiment 2. The tablet composition according to Embodiment 1, wherein the active ingredient comprises a Spinosad.

Embodiment 3. The tablet composition according to Embodiment 1 or Embodiment 2, comprising:
- 7.3 wt % to 7.7 wt % of the active ingredient;
- 79 wt % to 83 wt % of the plaster;
- 9.2 wt % to 9.7 wt % of the water-soluble binder;
- 0.74 wt % to 0.77 wt % of the non-water soluble binder; and
- 0.93 wt % to 0.97 wt % of the lubricant.

Embodiment 4. The tablet composition according to any one of Embodiments 1-3, wherein a mass of the tablet composition is 420 milligrams (mg) to 875 mg.

Embodiment 5. The tablet composition according to any one of Embodiments 1-4, wherein the hardness is no less than 95 Newtons (N) and no more than 215 N.

Embodiment 6. The tablet composition according to any one of Embodiments 1-4, wherein a ratio of hardness to surface area of the tablet composition is no less than 0.50 N/mm$^2$ and no more than 0.80 N/mm$^2$.

Embodiment 7. The tablet composition according to any one of Embodiments 1-4, wherein the hardness is no less than 120 Newtons (N) and no more than 190 N.

Embodiment 8. The tablet composition according to any one of Embodiments 1-7, wherein the water-soluble binder is polyethylene glycol;
- wherein the non-water-soluble binder is dicalcium phosphate; and
- wherein the lubricant is magnesium stearate.

Embodiment 9. The tablet composition according to any one of Embodiments 1-8, wherein the tablet composition is effervescent free.

Embodiment 10. The tablet composition according to any one of Embodiments 1-9, wherein a surface area of the tablet composition is no less than 180 mm$^2$ and no greater than 365 mm$^2$.

Embodiment 11. The tablet composition according to any one of Embodiments 1-10, wherein the diameter of the tablet composition is about 8 mm; and
- wherein a surface area of the tablet composition is no less than 180 mm$^2$ and no greater than 190 mm$^2$; and
- wherein a hardness of the tablet composition is no less than 115 N and no greater than 135 N.

Embodiment 12. The tablet composition according to any one of Embodiments 1-10, wherein the diameter of the tablet composition is about 10 mm; and
- wherein a surface area of the tablet composition is no less than 240 mm$^2$ and no greater than 255 mm$^2$; and
- wherein a hardness of the tablet composition is no less than 175 N and no greater than 200 N.

Embodiment 13. The tablet composition according to any one of Embodiments 1-10, wherein the diameter of the tablet composition is about 10 mm;
- wherein a surface area of the tablet composition is no less than 310 mm$^2$ and no greater than 320 mm$^2$; and
- wherein a hardness of the tablet composition is no less than 155 N and no greater than 175 N.

Embodiment 14. A method for making a tablet composition, the method comprising:
- mixing together:
  - 7.0 weight percent (wt %) to 8.0 wt % of an active ingredient;
  - 78 wt % to 85 wt % of a plaster;
  - 9 wt % to 10 wt % of a water-soluble binder;
  - 0.7 wt % to 0.8 wt % of a non-water soluble binder; and
  - 0.9 wt % to 1.0 wt % of a lubricant, to form a mixture;
- extruding the mixture;
- separating extruded material into granules;
- separating granules above a predetermined maximum size and below a predetermined minimum size;
- adding a lubricant to the separated granules;
- pressing a granule with lubricant into a tablet,
  - wherein the granule is pressed at a pressure between 140 MPa and 310 MPa; and
  - wherein a surface area of the tablet is no less than 180 mm$^2$ and no greater than 365 mm$^2$.

Embodiment 15. The method according to Embodiment 14, wherein the diameter of the tablet is about 8 mm; and
- wherein a surface area of the tablet is no less than 180 mm$^2$ and no greater than 190 mm$^2$; and
- wherein a hardness of the tablet is no less than 115 N and no greater than 135 N.

Embodiment 16. The method according to Embodiment 14, wherein the diameter of the tablet is about 10 mm; and
- wherein a surface area of the tablet is no less than 240 mm$^2$ and no greater than 255 mm$^2$; and
- wherein a hardness of the tablet is no less than 175 N and no greater than 200 N.

Embodiment 17. The method according to Embodiment 14, wherein the diameter of the tablet is about 10 mm;
- wherein a surface area of the tablet is no less than 310 mm$^2$ and no greater than 320 mm$^2$; and
- wherein a hardness of the tablet is no less than 155 N and no greater than 175 N.

Embodiment 18. The method according to any one of Embodiments 15-17, wherein the predetermined maximum size is 2 mm and the predetermined minimum size is 0.595 mm.

Embodiment 19. A method of using an insecticidal tablet composition, the method comprising:
- positioning the insecticidal tablet composition in a body of water, where the insecticidal tablet composition comprises:
  - 7.0 weight percent (wt %) to 8.0 wt % of an active ingredient;
  - 78 wt % to 85 wt % of a plaster;
  - 9 wt % to 10 wt % of a water-soluble binder;
  - 0.7 wt % to 0.8 wt % of a non-water soluble binder; and
  - 0.9 wt % to 1.0 wt % of a lubricant, wherein a diameter of the insecticidal tablet composition is no less than 8 mm and no greater than 12 mm; and
wherein a hardness of the insecticidal tablet composition is no greater than 220 Newtons (N).

Embodiment 20. The method according to Embodiment 19, wherein the insecticidal tablet composition causes a mortality rate of at least 80% against each of *Aedes albopictus*, *Culex quinquefasciatus*, and *Aedes aegypti* after 48 hours; and
wherein, after 48 hours, the insecticidal tablet composition maintains a mortality rate of at least 80% for at least 9 weeks.

The foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

The invention claimed is:

1. A tablet composition, comprising:
   7.0 weight percent (wt %) to 8.0 wt % of an active ingredient;
   78 wt % to 85 wt % of a plaster;
   9 wt % to 10 wt % of a water-soluble binder;
   0.7 wt % to 0.8 wt % of a non-water soluble binder; and
   0.9 wt % to 1.0 wt % of a lubricant,
   wherein the active ingredient, plaster, water-soluble binder, non-water soluble binder, and lubricant are mixed throughout the tablet composition in a mixture;
   wherein the tablet composition is effervescent free;
   wherein the tablet composition, when positioned in aqueous media, releases the active ingredient immediately and over an extended period of time from the mixture;
   wherein a compressed density of the tablet composition is between 2.10 mg/mm$^3$ and 2.20 mg/mm$^3$;
   wherein a diameter of the tablet composition is no less than 7 mm and no greater than 12 mm;
   wherein a hardness of the tablet composition is no greater than 220 Newtons (N); and
   wherein a ratio of hardness to surface area of the tablet composition is no less than 0.50 N/mm$^2$ and no more than 0.80 N/mm$^2$.

2. The tablet composition according to claim 1, wherein the active ingredient comprises a Spinosad.

3. The tablet composition according to claim 1, comprising:
   7.3 wt % to 7.7 wt % of the active ingredient;
   79 wt % to 83 wt % of the plaster;
   9.2 wt % to 9.7 wt % of the water-soluble binder;
   0.74 wt % to 0.77 wt % of the non-water soluble binder; and
   0.93 wt % to 0.97 wt % of the lubricant.

4. The tablet composition according to claim 1, wherein a mass of the tablet composition is 420 milligrams (mg) to 875 mg.

5. The tablet composition according to claim 4, wherein the hardness is no less than 95 Newtons (N) and no more than 215 N.

6. The tablet composition according to claim 1, wherein the hardness is no less than 120 Newtons (N) and no more than 190 N.

7. The tablet composition according to claim 6, wherein the water-soluble binder is polyethylene glycol;

wherein the non-water-soluble binder is dicalcium phosphate; and
wherein the lubricant is magnesium stearate.

8. The tablet composition according to claim 1, wherein a surface area of the tablet composition is no less than 180 mm$^2$ and no greater than 365 mm$^2$.

9. The tablet composition according to claim 1, wherein the diameter of the tablet composition is about 8 mm; and
   wherein a surface area of the tablet composition is no less than 180 mm$^2$ and no greater than 190 mm$^2$; and
   wherein a hardness of the tablet composition is no less than 115 N and no greater than 135 N.

10. The tablet composition according to claim 1, wherein the diameter of the tablet composition is about 10 mm; and
    wherein a surface area of the tablet composition is no less than 240 mm$^2$ and no greater than 255 mm$^2$; and
    wherein a hardness of the tablet composition is no less than 175 N and no greater than 200 N.

11. The tablet composition according to claim 1, wherein the diameter of the tablet composition is about 10 mm;
    wherein a surface area of the tablet composition is no less than 310 mm$^2$ and no greater than 320 mm$^2$; and
    wherein a hardness of the tablet composition is no less than 155 N and no greater than 175 N.

12. A method for making a tablet composition, the method comprising:
    mixing together:
       7.0 weight percent (wt %) to 8.0 wt % of an active ingredient;
       78 wt % to 85 wt % of a plaster;
       9 wt % to 10 wt % of a water-soluble binder;
       0.7 wt % to 0.8 wt % of a non-water soluble binder; and
       0.9 wt % to 1.0 wt % of a lubricant, to form a mixture;
    extruding the mixture;
    separating extruded material into granules;
    separating granules above a predetermined maximum size and below a predetermined minimum size;
    adding a lubricant to the separated granules;
    pressing a granule with lubricant into a tablet,
       wherein the granule is pressed at a pressure between 140 MPa and 310 MPa;
       wherein the active ingredient, plaster, water-soluble binder, non-water soluble binder, and lubricant are mixed throughout the tablet composition in a mixture;
       wherein the tablet is effervescent free;
       wherein the tablet, when positioned in aqueous media, releases the active ingredient immediately and over an extended period of time from the mixture;
       wherein a compressed density of the tablet is between 2.10 mg/mm$^3$ and 2.20 mg/mm$^3$;
       wherein a surface area of the tablet is no less than 180 mm$^2$ and no greater than 365 mm$^2$; and
       wherein a ratio of hardness to surface area of the tablet is no less than 0.50 N/mm$^2$ and no more than 0.80 N/mm$^2$.

13. The method according to claim 12, wherein the diameter of the tablet is about 8 mm; and
    wherein a surface area of the tablet is no less than 180 mm$^2$ and no greater than 190 mm$^2$; and
    wherein a hardness of the tablet is no less than 115 N and no greater than 135 N.

14. The method according to claim 12, wherein the diameter of the tablet is about 10 mm; and
    wherein a surface area of the tablet is no less than 240 mm$^2$ and no greater than 255 mm$^2$; and wherein a hardness of the tablet is no less than 175 N and no greater than 200 N.

15. The method according to claim 12, wherein the diameter of the tablet is about 10 mm;
   wherein a surface area of the tablet is no less than 310 mm² and no greater than 320 mm²; and
   wherein a hardness of the tablet is no less than 155 N and no greater than 175 N.

16. The method according to claim 12, wherein the predetermined maximum size is 2 mm and the predetermined minimum size is 0.595 mm.

17. A method of using an insecticidal tablet composition, the method comprising:
   positioning the insecticidal tablet composition in a body of water, where the insecticidal tablet composition comprises:
      7.0 weight percent (wt %) to 8.0 wt % of an active ingredient;
      78 wt % to 85 wt % of a plaster;
      9 wt % to 10 wt % of a water-soluble binder;
      0.7 wt % to 0.8 wt % of a non-water soluble binder; and
      0.9 wt % to 1.0 wt % of a lubricant,
   wherein the active ingredient, plaster, water-soluble binder, non-water soluble binder, and lubricant are mixed throughout the tablet composition in a mixture;
   wherein the tablet composition is effervescent free;
   wherein the tablet composition, when positioned in the body of water, releases the active ingredient immediately and over an extended period of time from the mixture;
   wherein a compressed density of the tablet composition is between 2.10 mg/mm³ and 2.20 mg/mm³;
   wherein a diameter of the insecticidal tablet composition is no less than 8 mm and no greater than 12 mm;
   wherein a hardness of the insecticidal tablet composition is no greater than 220 Newtons (N); and
   wherein a ratio of hardness to surface area of the tablet is no less than 0.50 N/mm² and no more than 0.80 N/mm².

18. The method according to claim 17, wherein the insecticidal tablet composition causes a mortality rate of at least 80% against each of *Aedes albopictus*, *Culex quinquefasciatus*, and *Aedes aegypti* after 48 hours; and
   wherein, after 48 hours, the insecticidal tablet composition maintains a mortality rate of at least 80% for at least 9 weeks.

* * * * *